United States Patent
Keller

(10) Patent No.: US 7,778,308 B2
(45) Date of Patent: Aug. 17, 2010

(54) METHOD AND DEVICE FOR PROCESSING RECEIVED DATA OF A RADIO INTERFACE

(75) Inventor: Stefan Keller, Frieburg (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 992 days.

(21) Appl. No.: 11/137,128

(22) Filed: May 25, 2005

(65) Prior Publication Data

US 2005/0265473 A1      Dec. 1, 2005

(30) Foreign Application Priority Data

May 25, 2004    (DE)    ......... 10 2004 026 071

(51) Int. Cl.
*H04B 1/00*    (2006.01)
(52) U.S. Cl. ............ 375/148; 375/346; 455/78
(58) Field of Classification Search ......... 375/148, 375/346; 455/78
See application file for complete search history.

(56) References Cited

U.S. PATENT DOCUMENTS

| | | | |
|---|---|---|---|
| 5,761,613 A | 6/1998 | Saunders et al. | |
| 5,905,467 A | 5/1999 | Narayanaswamy et al. | |
| 5,933,466 A | 8/1999 | Oshima et al. | |
| 6,151,372 A | 11/2000 | Yamamoto | ............ 375/347 |
| 6,514,706 B1 | 2/2003 | Von Kalle et al. | ............ 435/6 |
| 7,039,137 B1 | 5/2006 | Lauterjung et al. | |
| 2005/0090205 A1* | 4/2005 | Catreux-Erceg et al. | ...... 455/78 |
| 2005/0254607 A1* | 11/2005 | Oura et al. | ............ 375/346 |
| 2007/0086513 A1* | 4/2007 | Fernandez-Corbaton et al. | . 375/148 |

FOREIGN PATENT DOCUMENTS

| | | | |
|---|---|---|---|
| EP | 1 125 377 B1 | 8/2001 | |
| EP | 1 276 251 | 1/2003 | ......... 7/8 |
| FR | 2 835 985 | 8/2003 | ......... 1/2 |
| WO | WO 00/30290 | 5/2000 | ......... 1/6 |
| WO | WO 2004/100432 | 11/2004 | |

OTHER PUBLICATIONS

Durgin (Space-Time Wireless Channels; Prentice Hall; Oct. 3, 2002; Chapter 8; Sections 8.1 & 8.2) See following link {http://proquest.safaribooksonline.com/013065647X/ch08lev1sec1}; pp. 1-14.*

* cited by examiner

*Primary Examiner*—Sudhanshu C Pathak
(74) *Attorney, Agent, or Firm*—DLA Piper LLP (US)

(57) ABSTRACT

The invention relates to an apparatus and method for processing received data (I1/Q1, I2/Q2; d1, d2) of a radio interface, wherein the received data includes a sequence of data which have been transmitted for the purpose of error reduction through different branches of a carrier ($R_k$) of the radio interface, and which are combined into a sequence of data (DATAOUT) to be outputted, wherein the combining is implemented on the basis of carrier information values ($R_{eq,k}$, $SINR_k$) of the different branches (k) relative to each other. A maximum ratio combining (MRC) is implemented in which the amplitudes of the branches of the carrier information ($R_{eq,1}$, ($R_{eq,2}$) are combined using a division method as a function of a disturbance information value (MIX, SINR1, SINR2) of the branches (k).

14 Claims, 1 Drawing Sheet

METHOD AND DEVICE FOR PROCESSING RECEIVED DATA OF A RADIO INTERFACE

PRIORITY INFORMATION

This application claims priority from German application 10 2004 026 071.0 filed May 25, 2004, which is hereby incorporated by reference.

BACKGROUND OF THE INVENTION

The invention relates to decoding received data that includes a sequence of data which are transmitted through different branches of a carrier radio interface for the purpose of error reduction, and, undergoing error reduction, which are combined to form a sequence of data to be output, wherein combining is implemented on the basis of carrier information values together with disturbance information values of the different branches relative to each other.

While signals or data are being transmitted via a radio interface with multi-path channels subject to fading, highly attenuated carriers (deep fades) are interfered with by superimposed errors. In order to avoid or reduce errors, diversity techniques are employed based on the principle of using independent channels since the low probability that all channels will be subject to simultaneous fading significantly enhances the reception of error-free data or recoverable data. The various diversity techniques serve to provide independent channels by differing means. Diversity significantly improves the required signal-to-noise ratio (SNR) for a specified bit error rate (BER) and allows for a considerably higher time variance while taking into account the maximum Doppler frequency—an important factor for reception by mobile receivers. In addition, diversity may, for example, be employed for synchronization schemes, such as carrier offset estimation, which can be operated with high accuracy, even given a low or negative signal-to-noise ratio.

One example of a diversity technique commonly employed is frequency diversity. Here the information or data are transmitted on different carrier frequencies. In order to ensure independent channels, the carrier separation must exceed the coherence width. Another diversity technique is time diversity. This is based on transmitting information distributed over different time slots. This can be achieved, for example, by employing interleaving combined with coding. However, a high level of cost/complexity is required for deep interleaving, with the result that this technique is not suited for applications having a restricted allowable delay. Yet another known commonly employed diversity technique is space diversity or antenna diversity. In space diversity, multiple antennas are employed, either on the transmitter side or the receiver side. In order to ensure independent channels, the antennas must be separated by several wavelengths.

The requisite combining of information from two or more receiver branches may vary in terms of the combining site and the combining method. A distinction may be made, for example, between combining before acquisition (i.e., before demodulation) of a received signal, and combining after acquisition (i.e., after demodulation). In Orthogonal Frequency Division Multiplex (OFDM) systems, combining is implemented after acquisition, usually directly after a Fourier transform before the equalizer or after a software-based combining (soft decision), that is, after demapping.

In addition, a distinction can be made between selection combining, equal gain combining, and maximum ratio combining. In selection combining, it is simply the branch or path with the highest signal-to-noise ratio that is selected. Implementation is very efficient. However, the information from all the other channels is dropped.

In equal gain combining, the signals with all weightings of the branches are set to a unit measure then added. This diversity technique is simpler than maximum ratio combining. However, the technique results in suboptimum efficiency. Maximum Ratio Combining (MRC) employs spatial combining weightings which are selected to maximize the signal-to-noise ratio of the output signal.

In order to achieve the maximum signal-to-noise ratio, the diversity branches must be weighted in a maximum ratio combiner by their corresponding fading amplitudes, and the phase shift of the channel must be compensated. The resulting sum must be normalized, thereby yielding the following MRC output value:

$$MRC = (a_1 R_1 e^{j\Phi_1} + a_2 R_2 e^{j\Phi_2})/(a_1^2 + a_2^2)$$

where $a_k$ is the amplitude, and $\Phi_k$ is the phase of the channel transfer function of the branch k for an instantaneously received carrier R.

These methods are generally known, from European Patent EP 1 125 377, for example, with respect to MRC combining for OFDM systems in a digital television system (e.g., Terrestrial Digital Video Broadcasting-DVB-T). Here, however, a technique is used which utilizes weighting, addition, and division. Interference is not taken into account. Only the channel transfer function and/or soft information is used. U.S. Pat. No. 6,151,372 discloses a method in which weighting, addition, and division processes are employed, an orthogonal detection being used having separate analog-to-digital converters for the I-component and Q-component.

However, these diversity methods are disadvantageous. With combining before the Fourier transform, optimization is not possible for each carrier. In software-based combining, use of channel state information (CSI) is not possible during this step. In carrier-based combining, conventional weighting, addition and division methods are employed—with the resulting complexity/expense. In addition, it is not possible to use interference information. To the degree that these methods take into account a noise level, this level is assumed to be constant for all carriers.

Therefore, there is a need for an improved technique for processing data which are transmitted through a radio interface by different channels.

SUMMARY OF THE INVENTION

Accordingly, a method for processing received data, in particular, of a radio interface is advantageous, wherein the received data includes a sequence of data which are transmitted through different branches of a carrier radio interface, for the purpose of error reduction, and, undergoing error reduction, are combined to form a sequence of data to be output, wherein combining is implemented on the basis of carrier information values together with disturbance information values of the different branches relative to each other.

A device for processing received data of a radio interface includes a mixer to combine the data of a data sequence, which have been transmitted through different branches of a carrier, based on a disturbance information value and a mixed signal delivery device to provide the disturbance information as a mixed signal, wherein the disturbance information is generated from disturbance information components of the various branches.

The disturbance information value is taken into account on a carrier basis. For example, the noise level is not assumed to be constant for all carriers but is instead determined and taken into account for each carrier.

Maximum ratio combining may be implemented wherein the amplitudes of the branches of carrier information are combined as a function of the disturbance information values of the branches.

Combining may be implemented by mixing the carrier information based on disturbance information values of the different branches weighted relative to each other.

The disturbance information may be determined from the signal-to-interference ratios and/or signal-to-noise ratios of the individual branches. In terms of disturbance information values, noise and interference are taken into account either individually or in combination.

A disturbance information value may be generated by division of disturbance information components of different branches, for example, according to the equation:

MIX=SINR2/(SINR1+SINR2).

A disturbance information value may be generated using approximated division of disturbance information components of different branches, for example, according to the equation:

MIX=$(X/2^{x0})*(2-((X+Y)/2^{x0}))$ where X0 is the closest power of 2 and X,Y are the disturbance information components of the different branches.

What is accordingly particularly advantageous is not only the utilization of an exact division but in particular the avoidance of an exact division which would be required for a sequence of weighting, adding, dividing, or would at least be viewed as advantageous according to previously known approaches. A mixer factor can be calculated as the disturbance information, however, using an approximated division of lower precision, without degrading signal quality.

The amplitudes of the branches of the carrier information may be determined by a phase correction and a division by an amplitude value for each respective branch, for example, according to the equation:

$R_{eq,k}=R_k e^{j\Phi k}/a_k$.

The disturbance information of a branch may be determined by a division of the amplitude, or the square of the amplitude, of the branch by the noise components of the branch, for example, by the sum of the noise power level and the interference power level according to the equation:

$SINR_k=a_k^2/(N_k+I_k)$.

The branches may be created by different signal transit paths and/or different employed channels of a single sequence of received data.

Combining may be implemented after equalizing, where the sequence of data has preferably previously been normalized using the relevant channel transfer function or channel state information.

In order to determine a disturbance information value an interference power value may be determined by carrier-based measurements of the average power of a carrier, by employing a time derivative of channel state information of the carrier, and/or by estimating transmitted data.

The mixed signal delivery device may include a division device to divide the disturbance information components of the two branches.

These and other objects, features and advantages of the present invention will become more apparent in light of the following detailed description of preferred embodiments thereof, as illustrated in the accompanying drawings.

DETAILED DESCRIPTION OF THE INVENTION

The embodiments are based on a design comprising a combiner and employing a mixer system, wherein an approximation is employed for the division. Preferably, optimal efficiency is provided based on carrier-based processing, a combination having the correct maximum ratio, and the use of interference information.

What are described here are modified MRC receivers which model crosstalk from intercarrier interference (ICI) as frequency-selective noise, then weight the diversity paths accordingly. Preferably, this MRC modification is usable for all types of frequency-selective noise or frequency-selective interference. For example, long-term measurements of interference on a data carrier can be used for this improved maximum ratio combining (MRC).

Figure 1:
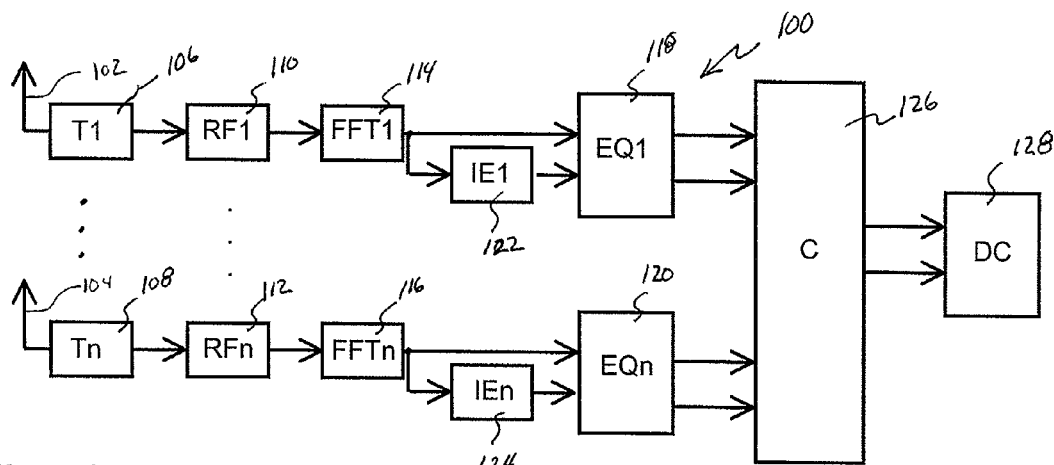
FIG. 1 is a block diagram illustration of a diversity receiver that receives signals through multiple antennas.

FIG. 1 illustrates a diversity receiver 100 receiving signals through a plurality of antennas 102, 104, which each provide a received signal to their associated tuner 106, 108, respectively. Each tuner 106, 108 provides a signal to an associated one of analog and digital receiver pre-stage, 110, 112, respectively. The analog and digital receiver prestages 110, 112 provide processed data to an associated Fourier transformation unit 114, 116, respectively. Each of the Fourier transform units provides frequency domain information to an associated equalizer 118, 120, and an associated circuit to estimate channel, noise, and interference 122, 124. Using a known approach, each of the equalizer circuits 118, 120 has two outputs which are applied to a combiner 126. The combiner 126 implements shared processing of the data applied by the equalizers 118, 120. Data from the combiner 126 are output for further processing to a circuit for demapping and channel decoding 128.

The receiver 100 illustrated in FIG. 1 is an example of an embodiment having mixing after the Fourier transform wherein a required buffer using the output buffer of the Fourier transform can advantageously be reduced.

Figure 2:
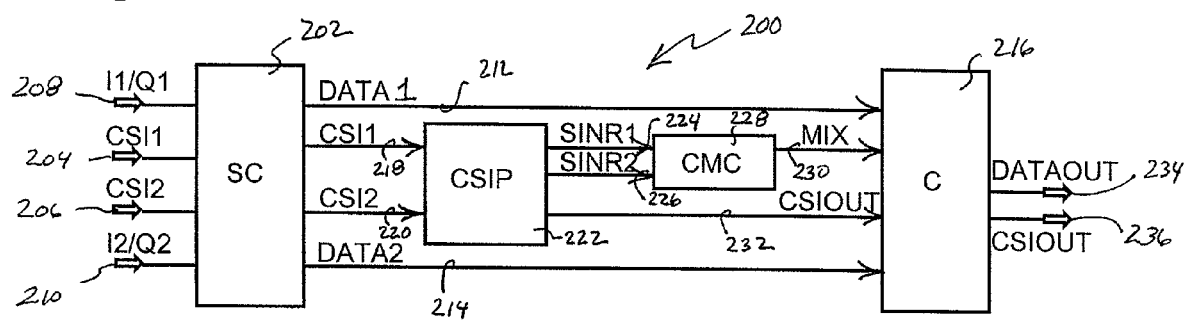
FIG. 2 is a block diagram illustration of a second embodiment with an MRC combiner using CSI.

FIG. 2 illustrates a MRC combiner 200 that includes a synchronization circuit 202 that receives first channel state information value on a line 204 and second channel state information on line 206. It is, of course, possible to expand this to more than two input branches. The synchronization circuit 202 also receives first and second actual signal or signal ratio I1/Q1, I2/Q2 on a line 208, 210, respectively. The synchronization circuit 202 outputs two data streams DATA1, DATA2 on lines 212, 214, respectively which are supplied to a combiner 216. In addition, two channel state information values CSI1, CSI2 on lines 218, 220 are supplied to a channel state information processing circuit (CSIP) 222 which processes the channel state information values CSI1, CSI2. These are processed together. Two signals SINR1, SINR2 on lines 224, 226 containing information about the signal-tonoise ratios of the two input signals are output by the CSIP 222. These two signals SINR1, SINR2 are supplied to a calculation for mixing coefficients (CMC) 228 which outputs a mixed signal MIX on a line 230 and supplies it to the combiner 216. The channel state information processing circuit (CSIP) also outputs a channel state information value CSIOUT on a line 232 to the combiner 216. The combiner 216 implements a combined calculation and outputs a sequence of data values DATAOUT on a line 234 and corresponding channel state information value CSIOUT on a line 236.

Figure 3:
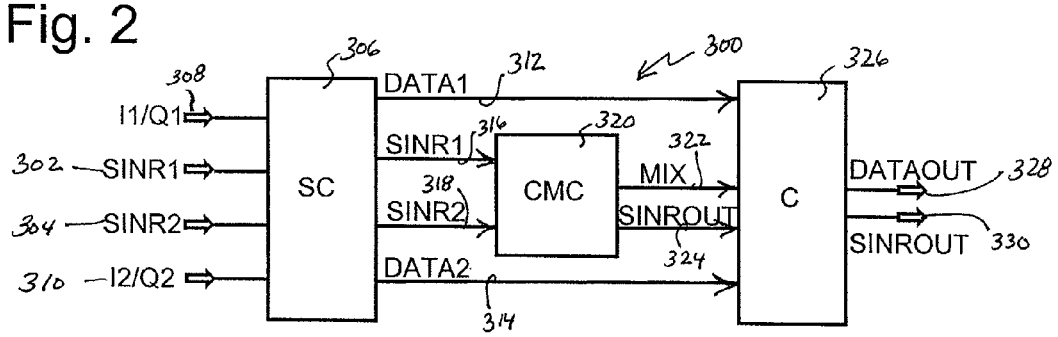
FIG. 3 is a block diagram illustration of a third embodiment with an MRC combiner using SINR (signal to interference and noise ratio)

FIG. 3 illustrates an MRC combiner 300 that receives first and second signal-to-interference-and-noise ratio (SINR) signal on lines 302, 204 based on the example of two input branches or signal sequences from two signal sources. Signal sources are understood here to also include data sequences from a single signal source which have passed through different signal paths or signal branches to the receiver, this understanding also applying to the other embodiments.

In addition to receiving the signals on the lines 302, 304, synchronization circuit 306 also receives SINR2, and first and second actual signals or signal ratios (I1/Q1, I2/Q2) on lines 308, 310, respectively. After appropriate data processing, the synchronization circuit 306 provides corresponding first and second sequences of data DATA1, DATA2 on lines 312, 314 to a combiner 326. The synchronization circuit 306 also outputs two SINR signals or data sequences SINR1, SINR2 on lines 316, 318, respectively to a calculate mixing coefficients circuit (CMC) 320, the circuit functioning as a mixed signal delivery device. This device 320 provides a mixed signal MIX on a line 322 and a common SINR signal SINROUT on a line 324 to the combiner 326. The combiner 326 calculates the actual sequence of data DATAOUT provided on a line 328 along with a corresponding SINR and corresponding signal, or a data sequence SINROUT with an associated SINR on a line 330.

Figure 4:
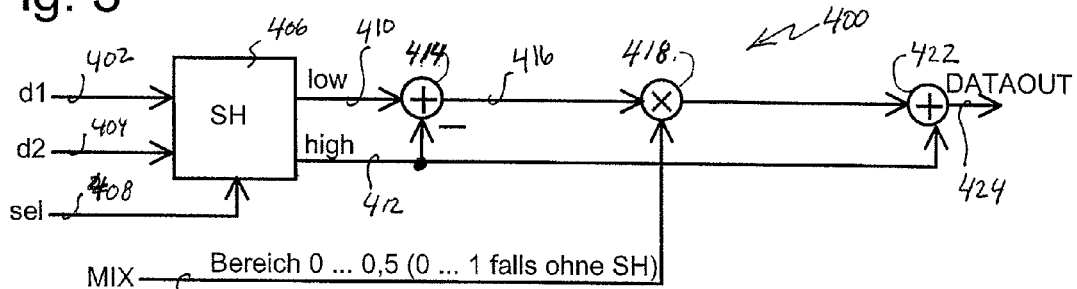
FIG. 4 is a block diagram illustration of a fourth embodiment with combining using a mixer system.

FIG. 4 illustrates a mixer system 400 for a combination. Two sequences of data d1, d2 are supplied on lines 402, 404, respectively to a shuffle circuit 406 to which a corresponding selection signal se1 on a line 408 is also applied. The shuffle circuit 406 should be viewed here as an optional component. Signals or data sequences are output by the shuffle circuit 406 in the low and high states via lines 410, 412, respectively. In a first addition or subtraction device 414, the data in the high state on the line 412 are subtracted from the corresponding data in the low state on the line 410. The subtraction result is supplied on the line 416 to a multiplier 418, which also receives a mixed signal on a line 420. In the event the shuffle circuit 406 is employed, the values for mixed signal MIX on the line 420 lie between 0 and 0.5. Otherwise the values lie between 0 and 1. Using a second addition circuit 422, the corresponding data in the high state are added to the thus multiplied or mixed signal, and the resultant sum data DATAOUT is output on line 424.

In terms of the structure of the combiner and its control, the following relationship is utilized. Given the maximum ratio combination, the conventional approach is used to implement a weighting of the input branches, addition and normalization, with the applicable relation being:

$$MRC=(a_1R_1e^{j\Phi 1}+a_2R_2e^{j\Phi 2})/(a_1^2+a_2^2).$$

This can be rewritten for the equalized carriers by employing the signal-to-interference-and-noise ratio (SINR) for the individual branches or signal sources to:

$$MRC=(SINR_1R_{eq,1}+SINR_2R_{eq,2})/(SINR_1+SINR_2)$$
$$=R_{eq1}-mix*(R_{eq1}-R_{eq,2})$$

where $$R_{eq,k}=R_ke^{j\Phi k}/a_k \text{ and}$$

$$SINR_k=a_k^2/(N_k+I_k).$$

The subscripts here indicate assignment to the different input branches or signal sources. The variable $a_k$ represents the amplitude, while $\Phi_k$ represents the phase of the channel transfer function of the corresponding branch k of the carrier R considered at that instant. In addition, $R_{eq,k}$ indicates the corresponding value for the carrier after equalization. The shuffle thus results in a simple mixing structure that requires only two additions and one multiplication.

Generation of the signal-to-interference-and-noise ratio (SINR) can be implemented in a variety of ways. In one approach, the ratio can be combined directly by combination to yield a signal-to-interference-and-noise ratio (SINR)=$A^2$/(N+I), where A represents the instantaneous amplitude, N the instantaneous noise content, and I the instantaneous interference power. In a second approach, a channel state information value can be determined from the separate values, specifically, from the amplitude A of the channel transfer function, the noise power level N, the measured interference power level I, and the time derivation of the contrast transfer function CTF for the ICI level.

The required mixing value MIX for the combination of two branches is then derived to yield:

$$MIX=SINR2/(SINR1+SINR2)=X/Y.$$

It should be noted that this division, unlike the conventional approach, is not part of the channel equalization. The precision requirements are thus much lower.

To achieve efficient implementation, this division can thus be approximated, for example, by:

$$MIX=(X/2^{x0})*(2-((X+Y)/2^{x0}))$$

where x0 is the closest power of 2.

In alternative implementation methods, a plurality of variants exists for the described embodiments. For example, implementation without the use of the interference information is possible. In addition, a transfer to the use of more than two receivers or reception branches is possible. This is true in particular for the use of a priority chaining approach. It is also possible to have synchronization between the input branches at different locations within the circuits. Calculation of the mixing value can also be implemented using another division, that is, either with more precision, or only with less precise approximation.

Although the present invention has been shown and described with respect to several preferred embodiments thereof, various changes, omissions and additions to the form and detail thereof, may be made therein, without departing from the spirit and scope of the invention.

What is claimed is:

1. A method for processing received data of a radio interface, wherein the received data includes a sequence of data which have been transmitted for the purpose of error reduction through different branches (k) of a carrier of the radio interface, comprising:

combining the sequence of data in a combiner on the basis of carrier information values in connection with disturbance information values of the different branches relative to each other to provide a data output, wherein a disturbance information value is generated by a division of disturbance information components (SINR1, SINR2) from different branches (k) according to the equation

MIX=SINR2/(SINR1+SINR2).

2. The method of claim 1, wherein the step of combining comprises maximum ratio combining in which the amplitudes of the branches of carrier information are combined as a function of the disturbance information values, of the branches (k).

3. The method of claim 1, wherein the combining is implemented by mixing the carrier information based on the disturbance information values of the two branches (k) weighted relative to each other.

4. The method of claim 1, wherein the disturbance information value (MIX) is determined from at least one of signal-to-interference and signal-to-noise ratios (SINR1, SINR2) of the individual branches (k).

5. A method for processing received data of a radio interface, where the received data includes a sequence of data which have been transmitted for the purpose of error reduction through different branches (k) of a carrier of the radio interface, comprising:
combining the sequence of data in a combiner on the basis of carrier information values in connection with disturbance information values of the different branches relative to each other to provide a data output,
wherein a disturbance information value is generated using an approximated division of disturbance information components of different branches (k) according to the equation MIX=$(X/2^{x0})*(2-((X+Y)/2^{x0}))$ where x0 is the nearest power of 2, and X, Y are the disturbance information components of the different branches.

6. The method of claim 5, wherein amplitudes of the branches (k) of the carrier information are determined by a phase correction and a division by an amplitude value of the respective branch (k), in particular, are determined according to the equation $R_{eq,k}=R_k e^{j\Phi k}/a_k$.

7. The method of claim 5, wherein the disturbance information component ($SINR_k$) of a branch (k) is determined by a division of the amplitude, or the square of the amplitude ($a_k^2$), of the branch (k) by the disturbance information components of the branch, in particular, by the sum of the noise power level ($N_k$) and the interference power level ($I_k$) according to the equation $SINR_k=a_k^2/(N_k+I_k)$.

8. The method of claim 5, wherein the branches (k) are generated by different signal transit paths and/or different channels of a single sequence of received data.

9. The method of claim 5, wherein the combining is implemented after equalizing, the sequence of data preferably being normalized using the respective channel information, in particular, channel transfer function or channel state information.

10. The method of claim 5, wherein, in order to determine a disturbance information value, an interference power (I) is determined by carrier-based measurements of the average power of a carrier, by using a time derivation of a channel state information value of the carrier, and/or by an estimation of transmitted data.

11. A device for processing received data of a radio interface, comprising:
a mixer to combine data of a data sequence, which has been transmitted through different branches (k) of a carrier ($R_k$), on the basis of a disturbance information value; and
a mixed signal delivery device to supply the disturbance information value as a mixed signal;
wherein the disturbance information value is generated from disturbance information components of the different branches; and
wherein the disturbance information value is generated by a division of the disturbance information components (SINR1, SINR2) from different branches (k) according to the equation

MIX=SINR2/(SINR1+SINR2).

12. The device of claim 11, wherein the mixed signal delivery device has a division device to divide the disturbance information components of the different branches.

13. The device of claim 11, wherein the mixed signal delivery device has a division device to divide the disturbance information components of the different branches.

14. A device for processing received data of a radio interface, comprising:
a mixer to combine data of a data sequence, which has been transmitted through different branches (k) of a carrier ($R_k$), on the basis of a disturbance information value; and
a mixed signal delivery device to supply the disturbance information value as a mixed signal;
wherein the disturbance information value is generated from disturbance information components of the different branches; and
wherein the disturbance information value is generated using an approximated division of disturbance information components of different branches (k) according to the equation MIX=$(X/2^{x0})*(2-((X+Y)/2^{x0}))$ where x0 is the nearest power of 2, and X, Y are the disturbance information components of the different branches (k).

* * * * *